United States Patent [19]

Kometani et al.

[11] 4,282,196

[45] Aug. 4, 1981

[54] METHOD OF PREPARING OPTICAL FIBERS OF SILICA

[75] Inventors: Thomas Y. Kometani, Warren Township, Somerset County; Darwin L. Wood, New Providence, both of N.J.

[73] Assignee: Bell Telephone Laboratories, Incorporated, Murray Hill, N.J.

[21] Appl. No.: 84,066

[22] Filed: Oct. 12, 1979

[51] Int. Cl.$^3$ .............................................. C01B 33/12
[52] U.S. Cl. ...................................... 423/337; 423/341
[58] Field of Search ................................. 423/337, 341

[56] References Cited

U.S. PATENT DOCUMENTS

| | | | |
|---|---|---|---|
| 2,820,698 | 1/1958 | Krchma | 423/341 |
| 2,977,198 | 3/1961 | MacInnis | 423/341 |
| 3,071,444 | 1/1963 | Theurer | 423/341 X |

FOREIGN PATENT DOCUMENTS

| | | | |
|---|---|---|---|
| 1046582 | 12/1958 | Fed. Rep. of Germany | 423/341 |
| 1138746 | 10/1962 | Fed. Rep. of Germany | 423/341 |
| 135613 | 5/1979 | Fed. Rep. of Germany | 423/341 |
| 36-24053 | 12/1961 | Japan | 423/341 |

OTHER PUBLICATIONS

Beattie et al., "J. of the Chem. Soc.", (Britain), pp. 2072–2075, (1962).
Iler, "The Colloid Chem. of Silica and Silicates", pp. 68–71, Cornell Univ. Press (1955).

*Primary Examiner*—Jack Cooper
*Attorney, Agent, or Firm*—Peter V. D. Wilde

[57] ABSTRACT

A hydrolysis method of purifying silicon tetrachloride is shown that reduces losses in optical fibers made from silica produced therefrom. Water is added to impure liquid silicon tetrachloride, which forms a gel which is then separated from the remaining $SiCl_4$. Metal impurities, OH-containing impurities, and $SiHCl_3$ are removed by this process. In a preferred embodiment, the water is added by bubbling a wet gas through the $SiCl_4$. A residual amount of OH containing impurities and HCl is left after the hydrolysis, which impurities may be further removed by a refluxing technique.

6 Claims, 3 Drawing Figures

METHOD OF PREPARING OPTICAL FIBERS OF SILICA

BACKGROUND OF THE INVENTION

1. Field of the Invention

This invention relates to the purification of silicon tetrachloride, used in making optical fibers and semiconductor devices.

2. Description of the Prior Art

Silicon tetrachloride ($SiCl_4$) is frequently used as the source of silicon for making optical fibers. In particular, in the chemical vapor deposition (CVD) process, and in the modified chemical vapor deposition (MCVD) process for making optical fibers, $SiCl_4$ is oxidized to produce silica ($SiO_2$). Silicon tetrachloride is also used in the semiconductor industry as a source of silicon for making semiconductor devices. However, commercial grade silicon tetrachloride may contain impurities which have a minor effect on the performance of semiconductor devices, but have a major impact on the performance of optical fibers. For example, silicon tetrachloride containing certain amounts of heavy metal impurities, hydrogen containing impurities, and OH containing impurities may be suitable for making semiconductor devices but may be unsuitable for making optical fibers due to the added optical losses resulting from these impurities.

Some of the most significant loss-producing impurities are those which produce OH groups in the resulting optical fibers. Some impurities may themselves contain an OH group, such as trichlorosilanol ($SiCl_3OH$). Other impurities which contain hydrogen, such as trichlorosilane ($SiHCl_3$), may produce an OH bearing impurity in the optical fiber when the fiber is produced by either the CVD or the MCVD process. Numerous other hydrogen bearing impurities also produce OH compounds in the optical fiber. The OH group produces a set of vibrational absorption bands at 0.95, 1.25, and 1.39 microns, among others. These bands occur in the region of the spectrum having the lowest intrinsic absorption and the minimum material dispersion, and it is in this region where communication systems can be expected to operate. Therefore, it is desirable to reduce the impurities in the starting reagents that produce OH groups in the final optical fiber. Other impurities in commercial grade silicon tetrachloride include metals such as iron. These metals are believed to produce losses in optical fibers over a wide range of wavelengths.

One method of eliminating impurities from silicon tetrachloride is distillation; however, several of the impurities have a vapor pressure very close to that of the starting material, making distillation a difficult and energy-inefficient process. Another method, for removing metal impurities, is by reacting the silicon tetrachloride with sulfuric acid; see U.S. Pat. No. 2,977,198. Still another method, for removing boron and phosphorus, is by passing silicon tetrachloride through a column packed with dried, activated silica gel or other absorbant materials; see U.S. Pat. No. 3,071,444. It would be desirable to have an additional method of removing a wide range of impurities from impure silicon tetrachloride, producing silicon tetrachloride that is suitable for making low loss optical fibers.

SUMMARY OF THE INVENTION

We have invented a method of purifying impure silicon tetrachloride by adding water to impure liquid silicon tetrachloride. This hydrolyzes a portion of the silicon tetrachloride, producing a gelatinous substance which is then separated from the remaining liquid silicon tetrachloride. In a preferred embodiment, the water is added by bubbling a wet gas through the silicon tetrachloride. Additional steps may be taken to reduce residual levels of OH containing impurities and HCl that remain after the hydrolysis.

DETAILED DESCRIPTION

This detailed description relates to the method of purifying impure silicon tetrachloride by partial hydrolysis. When water is added to liquid silicon tetrachloride, a gel is produced. This gel is variously called "silicic acid" or "hydrated silica" or "silica gel." If the silicon tetrachloride is initially impure, it has been found that certain of these impurities will attach to this gel. By removing the gel from the remaining silicon tetrachloride, many of these impurities can thereby be removed. In addition, other impurities react directly with the added water, and are transformed into compounds, including HCl, that can be readily removed by a variety of methods.

In order to distinguish this invention from the prior art, the amount of water added is less than 25 weight percent of the initial silicon tetrachloride. This distinguishes from cases in which it is desired to obtain the gel itself. In practice, the amount of added water is typically much less, on the order of 5 percent water. In a preferred embodiment, the water is added to the silicon tetrachloride by bubbling a wet gas through agitated silicon tetrachloride.

Figure 1:
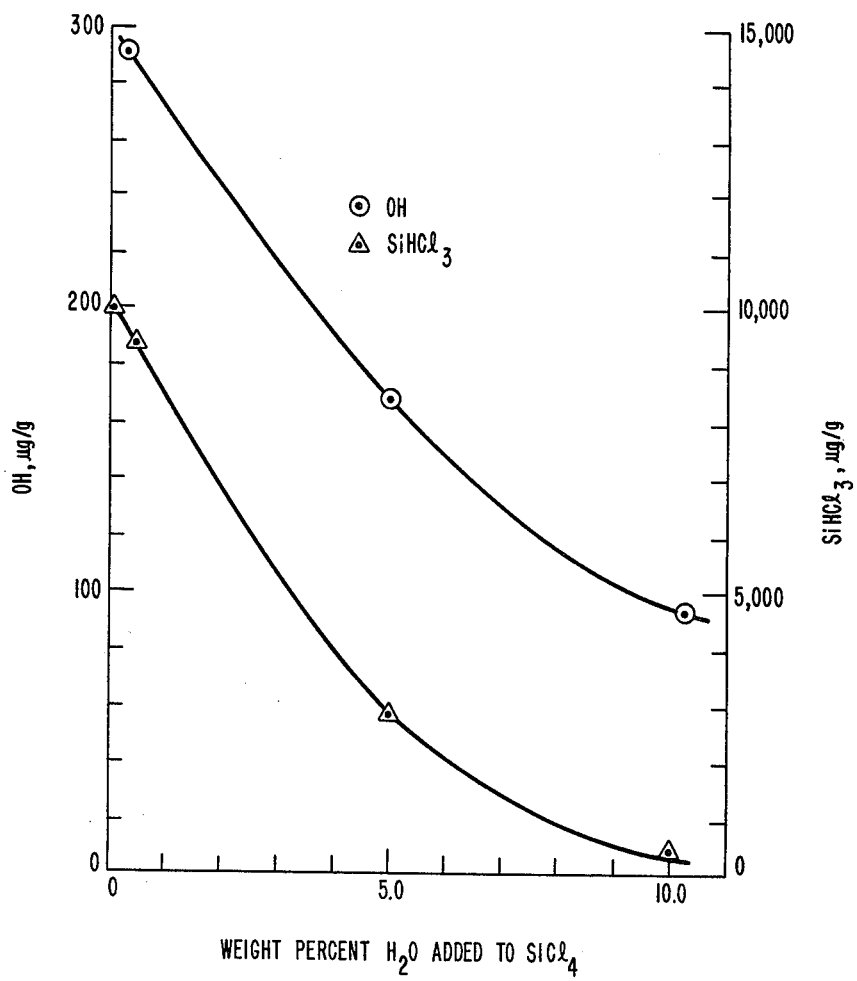
FIG. 1 shows the effect of adding water to silicon tetrachloride that has OH containing impurities and $SiHCl_3$.
Figure 2:
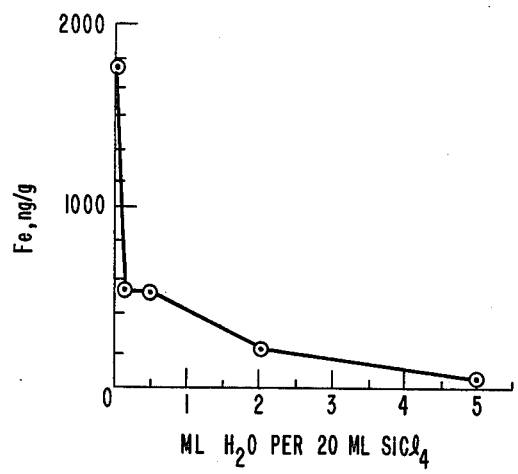
FIG. 2 shows the effect of adding water to silicon tetrachloride containing iron acetate.
Figure 3:
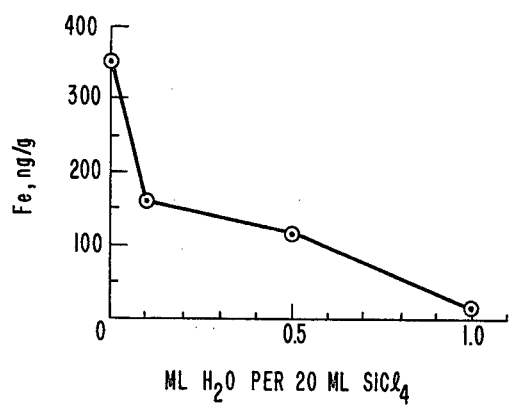
FIG. 3 shows the effect of adding water to silicon tetrachloride containing $FeCl_3$. Impurity levels are shown in micrograms or nanograms per gram of $SiCl_4$ ($\mu g/g$ or $ng/g$).

The efficiency of the process can be understood by referring to the impurity removal graphs of FIGS. 1, 2, and 3. FIG. 1 shows the amount of OH impurities and $SiHCl_3$ impurity removed for certain amounts of added water. At large percentages of added water a residual OH level of approximately 95 parts per million is obtained. Further experiments have shown that if the OH level had originally been less than 95 parts per million, the hydrolysis process would increase it to approximately this residual level. The other impurities show a continual decrease with increasing amounts of added water. FIGS. 2 and 3 show the reduction in iron with added water. In FIG. 2 the silicon tetrachloride was initially doped with iron acetate while in FIG. 3 the silicon tetrachloride was originally doped with $FeCl_3$.

For the data of FIGS. 1, 2, and 3, 20 milliliters of $SiCl_4$ was treated by simply pouring in the water while agitating the mixture by magnetic stirring until the gel was completely formed. Then the mixture was allowed to stand for 17 hours to achieve impurity removal. It has been found that most impurity removal occurs within 1 hour after adding the water, with decreasing additional removal thereafter. When the water is added by bubbling a wet gas through the SiCl₄ for several hours, a standing period is typically not necessary.

After the hydrolysis, a high level of hydrogen chloride remains in the purified silicon tetrachloride, as a by-product of the reaction of the water with the silicon tetrachloride and with certain of the impurities. The amount of hydrogen chloride may be reduced by exposing the silicon tetrachloride to a dry gas, as by bubbling a dry gas into the silicon tetrachloride, or by exposing the silicon tetrachloride to a dry gas atmosphere for a few days. Dry nitrogen gas, among others, is suitable for this purpose. The refluxing process described below also is effective in removing the remaining hydrogen chloride.

To reduce the level of the above-noted residual OH impurities, and to reduce the amount of remaining HCl, it has been found useful to employ a refluxing technique. This technique includes placing the silicon tetrachloride in a vessel having an open column, and heating the silicon tetrachloride to approximately its boiling point. Certain of the OH containing impurities react with $SiCl_4$ at the boiling temperature to form HCl, which escapes through the open column, whereas the silicon tetrachloride condenses on the sides of the vessel and returns to the boiling liquid. To further improve the process, a dry gas may be blown across the top of the open column to aid in the removal of the impurities. The refluxing technique also further reduces the amount of $SiHCl_3$ remaining in the $SiCl_4$ after hydrolysis.

It is known in the prior art that OH groups having as hydrogen the isotope deuterium have an absorption spectrum different from that noted above. In particular, the absorption bands are shifted away from the wavelengths around 1.3 micrometers, which is a region of high interest in low loss optical fiber communications. Therefore, "heavy water" comprising deuterium as the hydrogen species may be used instead of ordinary water for the hydrolysis process. This will help reduce the deleterious effects of the OH absorption bands. However, the presence of OH groups from sources other than the hydrolyzing water may still require further steps to reduce the OH level below that obtained by the hydrolysis method.

One measure of the efficiency of the hydrolysis process is the amount of silicon tetrachloride that is lost due to the formation of the gel. When 10 weight percent water reacts with silicon tetrachloride, approximately 25 percent of the silicon tetrachloride is lost due to the formation of the gel. As compared to pouring in water while agitating the mixture, when the water is added by bubbling a wet gas through agitated silicon tetrachloride, the water is dispersed throughout a larger effective volume of the silicon tetrachloride. Therefore, more impurities are removed for a given amount of gel formed. Thus, less silicon tetrachloride is lost due to the formation of the gel when the water is added by bubbling a wet gas, as compared to simply mixing the water in directly. Using wet nitrogen gas bubbled through the silicon tetrachloride, the same amount of removal of trichlorosilane can be achieved as in the mixing example with typically less than half as much silicon tetrachloride lost due to formation of the gel.

Variations on the wet gas technique are possible. For example, the silicon tetrachloride can simply be placed in a wet gas atmosphere and agitated in order to obtain hydrolysis. Numerous other gases, including wet oxygen, wet air, or steam could be used instead of wet nitrogen. The bubbling method and all variations in gases or methods are considered to be adding water by means of a wet gas.

The above noted procedures will be more fully explained by means of the example given below.

EXAMPLE $N_2$ was bubbled through water at 90 degrees C. to impart approximately 0.5 g $H_2O$/liter $N_2$ at one atmosphere. The wet $N_2$ was then bubbled through 1800 ml of $SiCl_4$ at room temperature for aproximately 3 hours at a flow rate of 1 liter/min. while agitating the $SiCl_4$ by magnetic stirring. About 100 grams of $H_2O$ reacted with the $SiCl_4$, and approximately 200 ml of $SiCl_4$ was volatilized during the bubbling. Approximately 170 ml of $SiCl_4$ was lost due to formation of the gel. The added water was thus about 3.7 weight percent of the initial amount of $SiCl_4$. The $SiCl_4$ was then separated from the gel resulting from the hydrolysis by filtering through a fiberglass mat into a refluxing vessel. The vessel included a reflux column on top, approximately 30 cm long, comprising bulbs which varied in diameter from 1 to 2 cm; cold water was circulated around the outside of this column. The $SiCl_4$ was heated in the refluxing vessel for 2 hours at 57 degrees C. while dry $N_2$ was blown across the opening at the top of the column.

The result of this treatment, showing impurity levels in parts per million (ppm) or parts per billion (ppb) by weight of $SiCl_4$ is given in Table I below.

TABLE I

|  | Fe ppb | OH ppm | HCl ppm | $SiHCl_3$ ppm |
|---|---|---|---|---|
| Before Treatment | 12 | 2 | 18 | 2526 |
| After Hydrolysis | 1 | 90 | 319 | 58 |
| After Reflux | 1 | 3 | 10 | 25 |

It has been found that the hydrolysis step has a synergistic effect when used prior to the refluxing step. For example, a sample of $SiCl_4$ with an initial OH level of 252 ppm was hydrolyzed and refluxed as in Example 1 above, reducing the OH level to approximately 3 ppm. However, when another sample with a 252 ppm OH level was refluxed for two hours, without prior hydrolysis, the OH level was reduced to only 26 ppm. An additional two hours of refluxing reduced the OH level to 11 ppm. Thus, the hydrolysis step makes refluxing more effective for reducing OH levels. A synergistic effect was also observed for HCl levels when hydrolysis was used prior to refluxing, as compared to refluxing alone.

It has also been found that $Cl_6Si_2O$ is typically produced when $SiCl_4$ contaminated with $SiCl_3OH$ is refluxed. The $Cl_6Si_2O$ is not presently a serious contaminant for optical fibers produced by the CVD or MCVD processes. However, if desired, the $Cl_6Si_2O$ may be removed by distillation more easily than can $SiCl_3OH$, due to the greater difference in vapor pressure. Thus, the hydrolysis and refluxing steps may advantageously precede a distillation step.

Although the above process has been described in terms of removing impurities that affect optical fiber performance, it can readily be seen that purification of $SiCl_4$ used for the production of semiconductor devices may also be contemplated. For example, silicon is frequently grown epitaxially by reducing $SiCl_4$ gas with hydrogen at the surface of a substrate. Very high purity $SiCl_4$ is needed for devices requiring a high resistivity silicon layer, as, for example, high voltage semiconductor devices.

The methods of introducing the water may of course be embodied in many variations, and many deviations of the wet gas preferred embodiment described herein are possible. Also, other methods are known in the prior art for reducing OH and HCl levels, and may be employed following the hydrolysis technique. When the SiCl₄ is to be used to make low loss optical fibers, the additional steps to reduce OH and HCl levels preferably reduce them to less than 50 parts per million each by weight, which is typically less than their levels immediately following hydrolysis.

Although the removal of iron has been measured, it is likely that other metals, and particularly other heavy metals, will be removed by the hydrolysis technique also. However, iron is especially troublesome, as iron impurities result from storing silicon tetrachloride in stainless steel vessels. In addition, iron and other impurities may be picked up by the silicon tetrachloride in the apparatus used in making optical fibers. The present method may thus be used for reclaiming otherwise unusable silicon tetrachloride.

All such variations and deviations which basically rely on the teachings through which this invention has advanced the art are properly considered to be within the spirit and scope of this invention.

We claim:

1. A method of making an optical fiber by steps comprising oxidizing silicon tetrachloride to form silica, CHARACTERIZED by the additional step of purifying prior to oxidation impure liquid silicon tetrachloride by steps comprising adding water to said impure liquid silicon tetrachloride and separating the gel formed thereby from the remaining silicon tetrachloride, with the amount of the added water being less than 25 weight percent of said impure liquid silicon tetrachloride, and thereafter forming an optical fiber comprising silica produced by the oxidation of said remaining silicon tetrachloride, and further characterized in that said water is added in sufficient amount so that the concentration of OH-containing impurities in said remaining silicon tetrachloride is approximately 95 parts per million by weight.

2. The method of claim 1 FURTHER CHARACTERIZED by adding said water by means of a wet gas.

3. The method of claims 1 or 2 FURTHER CHARACTERIZED by the further steps comprising reducing the amount of OH containing impurities and HCl in said remaining silicon tetrachloride to less than 50 parts per million by weight each.

4. The method of claim 14 FURTHER CHARACTERIZED by effecting said reducing the amount of OH-containing impurities and HCl by heating said remaining silicon tetrachloride to approximately its boiling point in a vessel having an opening, so that at least a portion of said remaining silicon tetrachloride condenses on the interior of said vessel.

5. The method of claim 4 FURTHER CHARACTERIZED by passing a dry gas across said opening of said vessel to aid in said reducing the amount of OH-containing impurities and HCl.

6. The method of claim 1 FURTHER CHARACTERIZED in that said water is heavy water comprising deuterium.

* * * * *